UNITED STATES PATENT OFFICE.

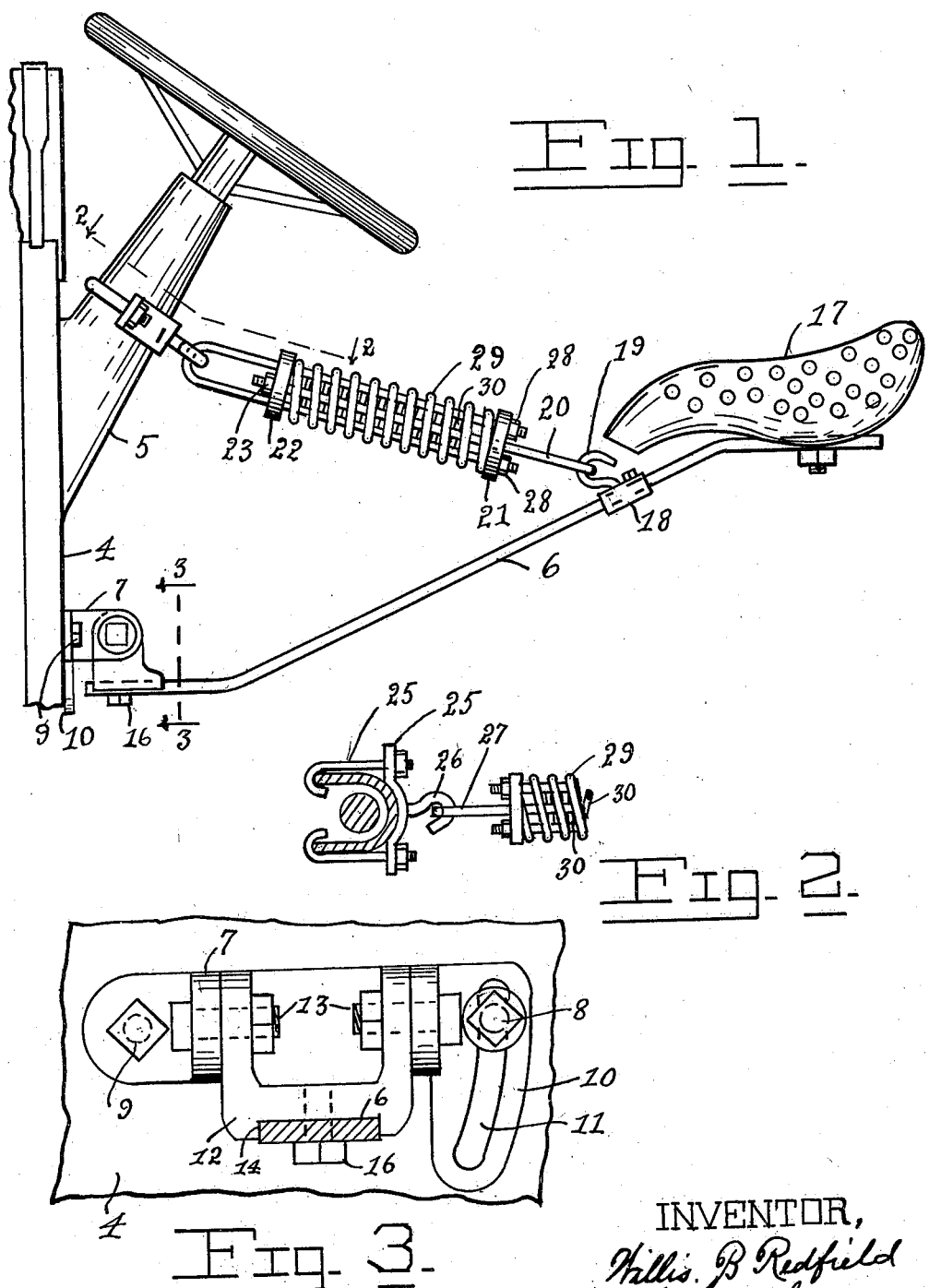

WILLIS B. REDFIELD, OF DOWNEY, CALIFORNIA.

SHOCK-ABSORBER.

1,395,974.   Specification of Letters Patent.   Patented Nov. 1, 1921.

Application filed May 3, 1920. Serial No. 378,437.

*To all whom it may concern:*

Be it known that I, WILLIS B. REDFIELD, a citizen of the United States, residing at Downey, in the county of Los Angeles, State of California, have invented new and useful Improvements in Shock-Absorbers, of which the following is a specification.

My invention relates primarily to a device for attachment to the seats of tractors and other implements, and the object thereof is to provide a simple and efficient attachment to the driver's seat which will prevent the jar to the driver usually attendant when the machine is working in rough ground.

In the drawings forming a part of this application, Figure 1 is a side elevation of so much of a tractor as is necessary to illustrate my invention, with my shock absorber attached thereto. Fig. 2 is a section on the line 2—2 of Fig. 1. Fig. 3 is an enlarged detail, with the seat bar in section on the line 3—3 of Fig. 1.

Referring to the drawings 5 is the steering post column of a Fordson tractor on which I have used my device. The seat bar 6 carries the driver's seat, all of ordinary construction and no part of my invention. The upper leaf 7 of the base hinge is secured to column 5 by bolts 8 and 9. One side of the leaf has an elongated ear 10 with a slot 11 therein through which passes bolt 8. This slot is radial to bolt 9 which secures the other side of the leaf to column 5. The lower leaf 12 is secured to the upper leaf by bolts 13 and has a recess 14 in which is received the end of seat bar 6 which bar is secured thereto by bolt 16.

Bar 6 carries seat 17. This construction permits the seat to move vertically. Mounted upon bar 6 near seat 17 is a clamp 18 which carries a hook 19 which hooks into the U-shaped member 20 of my shock absorber. Member 20 passes through end plates 21 and 22 and the ends are threaded externally of plate 22 and receive nuts 23 thereon. A clamp comprising plate 24 and bolts 25 is mounted upon column 5 as best shown in Fig. 2. Plate 24 carries a hook 26 which hooks into the U-shaped member 27 of my shock absorber. Member 27 passes through plates 21 and 22 and the ends are threaded externally of plate 21 and receives nuts 28 thereon. A spring 29 is preferably coiled around members 20 and 27 between plates 21 and 22 and is of such tension that when the shock absorber is positioned for use it will hold seat 17, with a driver of ordinary weight, in its normal position. To provide for drivers of heavy weight I may use a light spring 30 which is placed between plates 21 and 22 and within members 20 and 27. Spring 29 could be coiled within and spring 30 without members 20 and 27.

By this construction a simple and efficient shock absorber is provided which may be easily and quickly attached to tractors and other implements. To attach it to other implements it is only necessary to secure the base hinge to any suitable part of the machine, secure the seat bar to the hinge and attach one end of the shock absorber to the seat bar, and the other end of the shock absorber to a suitable part of the implement. It will be apparent that when going over rough ground my shock absorber will take off the usual jar from the driver and make riding easy.

Having described my invention I claim.

1. In a tractor having a steering column; in combination, a base hinge mounted on the steering column, said hinge comprising an upper leaf having a pair of ears and being adapted to be secured to the dashboard of the machine, and having a lower leaf pivotally secured to the upper leaf; a seat bar secured to said lower leaf; a seat on said bar; an adjustable clamp on said bar; a hook secured to said clamp; an adjustable clamp on the steering column; a hook secured to said last clamp; a pair of end plates; U-shaped members slidably mounted in said plates and secured in said hooks; and a spring between said plates.

2. In an implement means for changing the plane of the driver's seat with reference to the plane of the machine comprising a base hinge having a pair of leaves, the upper leaf being provided with a hole on one side and an ear on the other side, said ear having a slot therein, a seat bar secured to the other leaf, a seat on the bar; and yielding suspensory means for said bar.

In witness that I claim the foregoing I have hereunto subscribed my name this 26th day of April, 1920.

W. B. REDFIELD.